Figure 1:
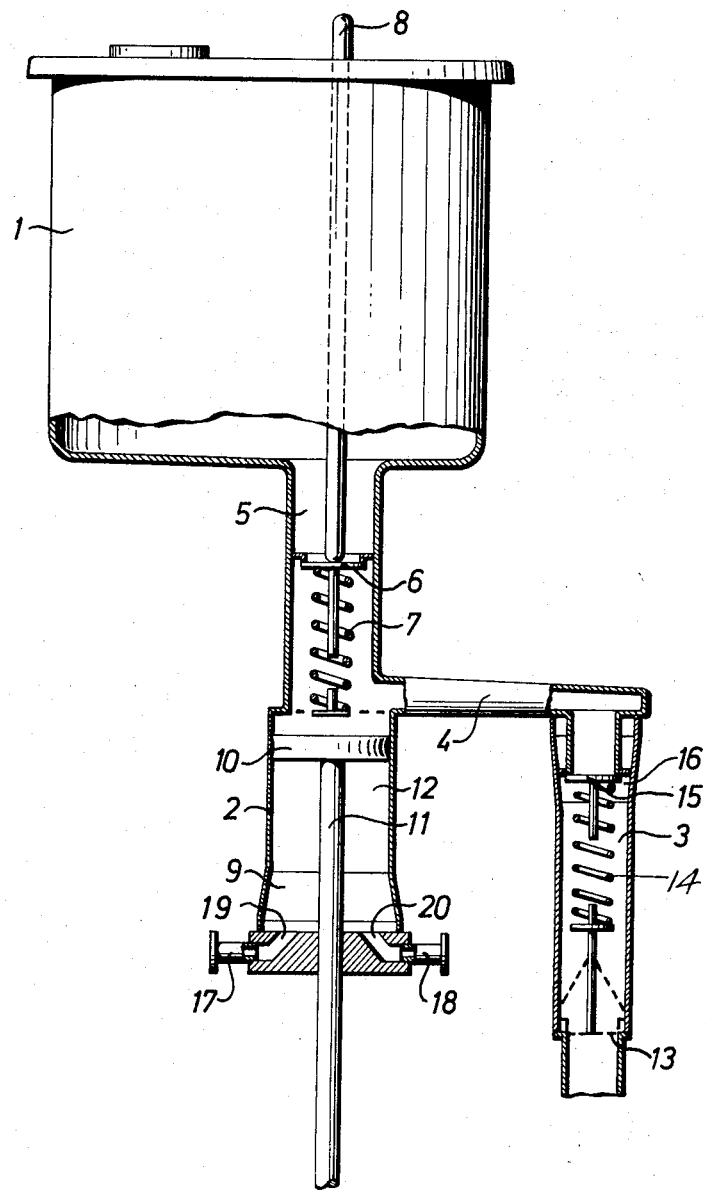

United States Patent

Wettlen et al.

[15] 3,693,640
[45] Sept. 26, 1972

[54] ARRANGEMENT FOR CLEANING OF DOSING SYSTEMS FOR FLUID MATERIALS

[72] Inventors: Roland Wettlen, Eslov; Hans-George Melle, Hoor; Jan Palsson, Lund, all of Sweden

[73] Assignee: Tetra Pak International AB, Lund, Sweden

[22] Filed: Dec. 21, 1970

[21] Appl. No.: 99,835

[30] Foreign Application Priority Data

Dec. 30, 1969 Sweden ................... 18062/69

[52] U.S. Cl. ................ 134/169 R, 134/196, 222/148
[51] Int. Cl. ............................................. B08b 9/08
[58] Field of Search ...... 134/22, 22 C, 23, 24, 169 R, 134/169 C, 196; 222/148

[56] References Cited

UNITED STATES PATENTS 2,717,576  9/1955  Hansen ................... 134/22 C
2,916,406  12/1959  Bulatkin ................... 134/22 C
3,195,781  7/1965  Egleston ................... 222/148
3,227,168  1/1966  Wight ................... 134/169 R
3,430,639  3/1969  Roberts ................... 134/169 R
3,513,024  5/1970  Culliton ................... 134/22 R Primary Examiner—Morris O. Wolk
Assistant Examiner—J. Zatarga
Attorney—Pierce, Scheffler & Parker

[57] ABSTRACT

A method of and apparatus for carrying out the method of cleaning a dosing system normally used for providing measured amounts of various liquids such as milk and the like, in which a pump is used for the dosing operation, whereby the entire dosing system is cleaned as well as both sides of a reciprocating piston in the pump and also the periphery thereof.

3 Claims, 5 Drawing Figures

ARRANGEMENT FOR CLEANING OF DOSING SYSTEMS FOR FLUID MATERIALS

The present invention concerns a method for cleaning such dosing systems for fluid materials as comprise a piston-type dosing pump, the dosing space of which communicates on the one hand with a material container via a spring-loaded suction valve, and on the other hand with a dosing tube via a spring-loaded pressure valve.

Dosing systems of this type are used in a variety of fields. One such field is, for instance, the packaging industry, where a dosing system of the said type is used among others for packaging of dairy products. In this respect, the requirements for hygienic packaging methods have come to be increasingly stringent, especially as regards the packaging of goods constituting favorable media for bacteria such as e.g. milk and curdled milk. Irrespective of whether a dosing system of the said type is used for dosing of food-stuffs, where hygiene must be taken into consideration, or for dosing of other products, at least a general cleaning of the dosing system must from time to time be carried out. Such a cleaning which is usually carried out during an exchange of products which are intended for dosing or during prolonged stillstands of production, e.g. overnight when the dosing system is not in operation, have hitherto been complicated and time-consuming since cleaning of the dosing system had to be effected by manual washing, it being necessary to remove and dismantle at least the dosing tube and the dosing pump. Besides, it was not possible to clean all parts of the dosing system effectively.

The purpose of the present invention is to facilitate the cleaning procedure and to achieve completely satisfactory cleaning of all parts of the dosing system which are in contact with the material and adjacent to it, this being possible by means of a cleaning process in accordance with the invention which is characterized in that communication ducts are provided on the one hand between the outlet of the dosing tube and that end of the pump cylinder which contains the piston-rod, and on the other hand between the said end of the pump cylinder and the material container, whereupon a cleaning agent is introduced into the dosing system and caused to circulate within the dosing system and in the said associated communicating ducts, the circulation being effected by the reciprocating movements of the piston.

The invention also concerns an arrangement which is intended to be applied in conjunction with the said method, whereby a piston-type dosing pump is provided in the arrangement, which is characterized in that the lower part of the pump cylinder has an internal cross-sectional area which is larger than that of the piston so that a cleaning agent can be caused to be circulated between the peripheral surface of the piston and the inner wall of the pump cylinder.

Figure 2:
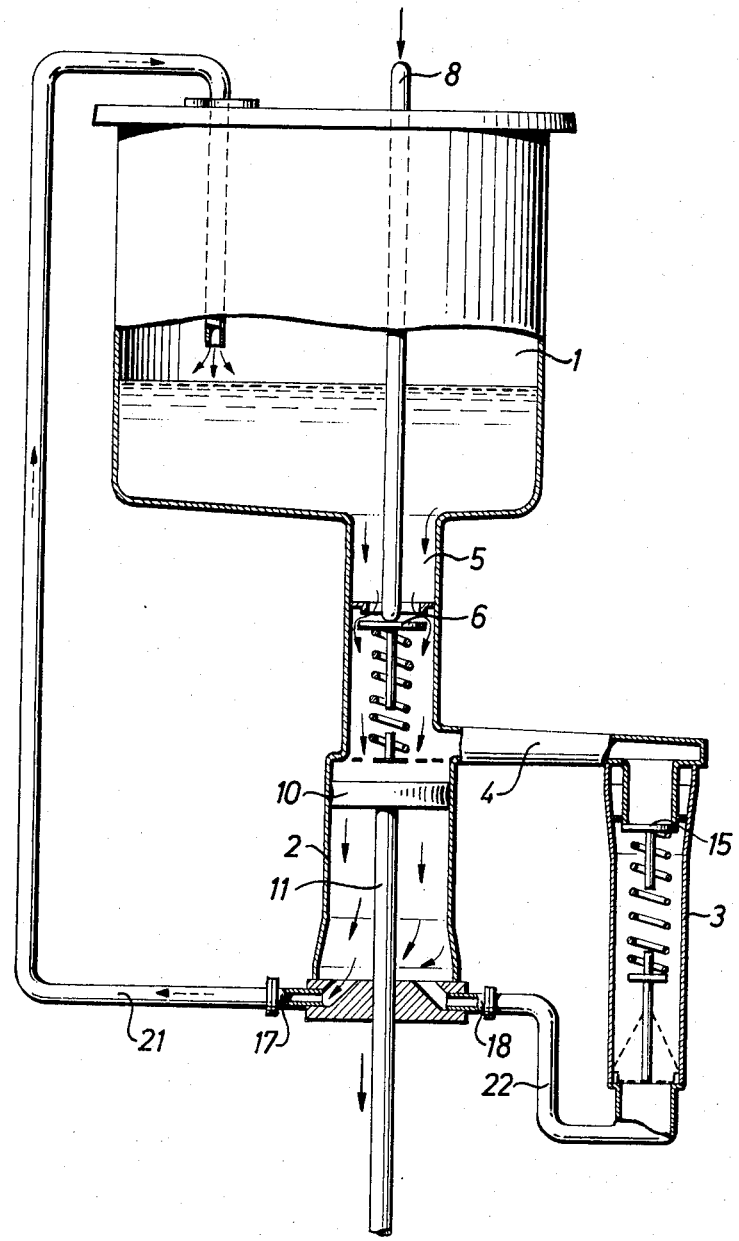
Figure 3:
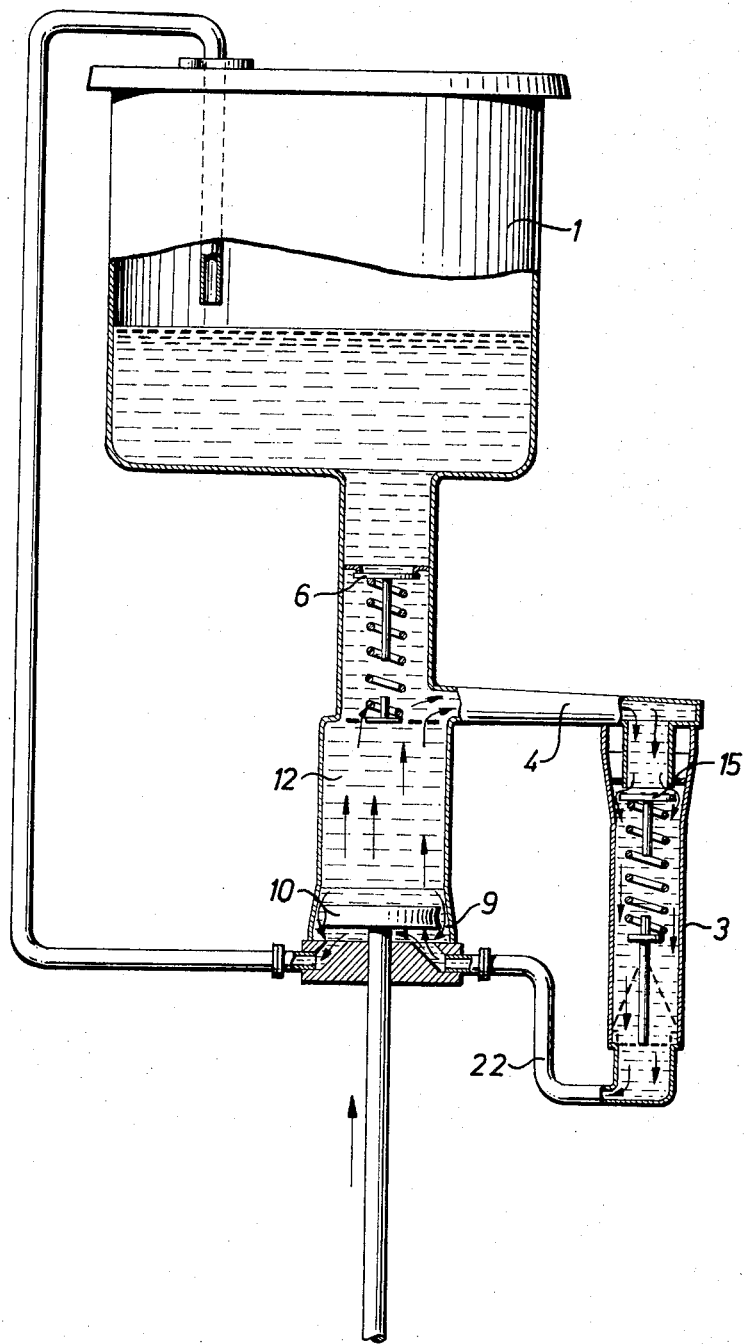
Figure 4:
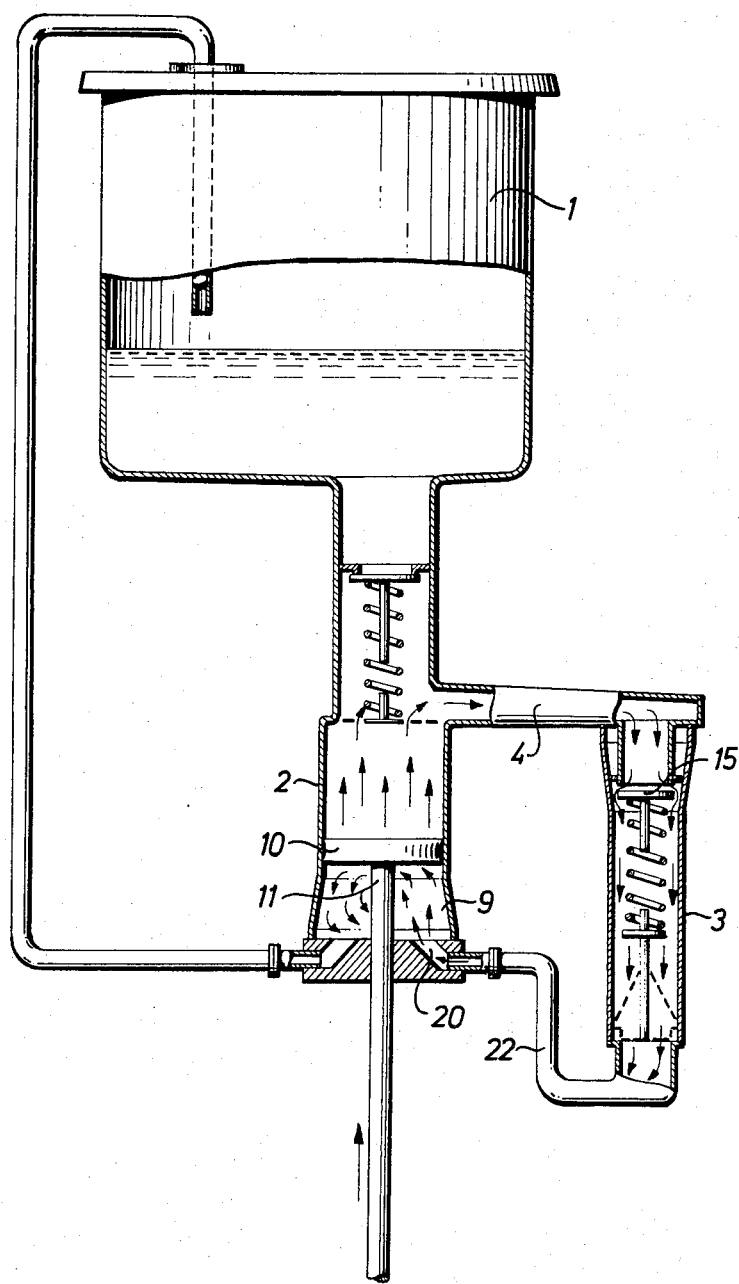
Figure 5:
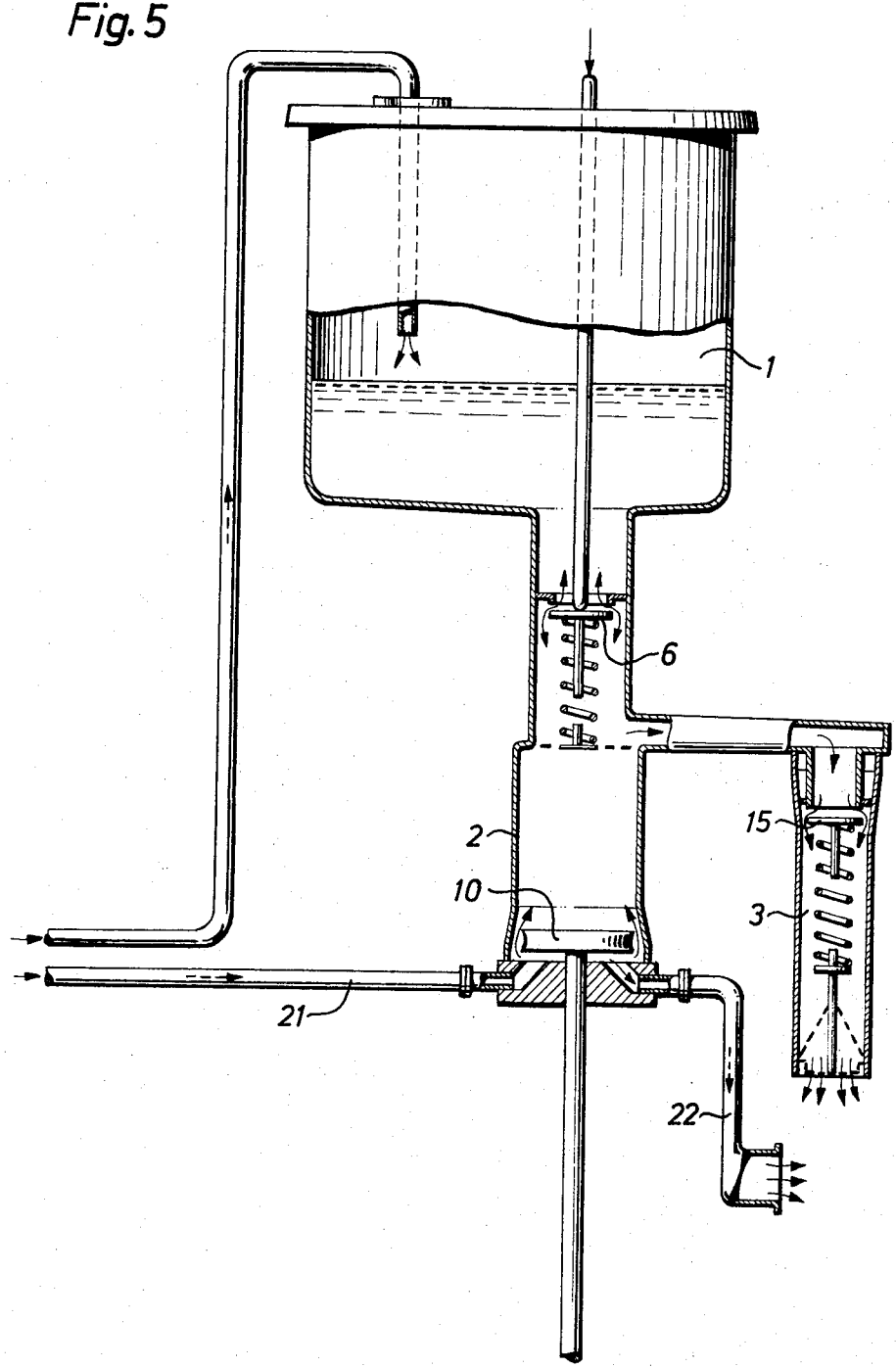

Further advantages and aims of the invention will become apparent in the following description of the invention, reference being made at the same time to the attached schematic drawings, in which a dosing system is shown in cross-section, as follows:

FIG. 1 shows the dosing system ready for operation,
FIGS. 2 – 4 show the flow of a cleaning agent during various stages of a cycle, and
FIG. 5 shows the dosing system during cleaning with steam.

Referring to FIG. 1, an example of a dosing system is first shown, which enables the cleaning process in accordance with the invention to be applied. Hence the dosing system shown in the figure comprises a material container 1, which is intended to receive the charge, a piston-type dosing pump 2, a dosing tube 3 and a connecting duct 4. The material container 1 may be of any known design, its bottom being provided with a discharge opening 5 which communicates with the dosing space 12 of pump 2. A suction valve 6 which is spring-loaded by means of a spring 7 is provided in the material container 1 so as to be capable of closing its discharge opening 5. The suction valve 6 is provided with a spindle 8 which extends beyond the outside of material container 1, so that the valve can be positively regulated from the outside of the dosing system. The dosing pump 2 consists of a cylinder which contains a piston 10. One end of the cylinder is opened and may conveniently be situated under the discharge opening 5 of the material container 1. Dosing space 12 of pump 2 communicates through connecting duct 4 with the dosing tube 3. Together with the dosing space 12 of pump 2 this results in a space which during operation of the dosing system is bounded by piston 10, the internal wall of the cylinder from the piston to the open end of the cylinder and by its base area. The dosing tube 3 may be of any type and shape whatever, but, as can be seen from the figure, it may be provided with a pressure valve 15 which is spring-loaded by means of a spring 14. The particular dosing system shown here is also provided with a relatively fine-mesh screen 13 in the dosing tube 3, and with dosing systems of this type the screen is usually located in the lower part of tube 3 or in its outlet, whereas the spring-controlled pressure valve 15 is provided in the upper end 16 of tube 3.

In order to be able to apply the cleaning process in accordance with the invention to a dosing system such as described above, the cleaning efficiency being satisfactory, the lower part 9 of the pump cylinder shall, on the one hand, have an inner cross-sectional area which is flared so as to be larger than the cross-sectional area of piston 10, and, shall on the other hand, have sockets 17 and 18 for connection of lines, and inlet and outlet 19 and 20 leading to and from the cylinder space, respectively. In this connection it must be stated that when the dosing system is being used for the dosing of material, the stroke of the piston is limited to the cylinder space above the said flared part below the cylinder.

When the dosing system is to be cleaned, it is advisable to remove the fine-mesh screen 13, if this is provided, from the dosing tube 3, and communicating ducts or lines 22 and 21 which are fitted on the one hand between the outlet of dosing tube 3 and socket 18 of the pump cylinder 2, and on the other hand between the socket 17 and the material container 1, as shown in FIG. 2, and the dosing system is filled with cleaning agent which is conveniently introduced into material container 1, whereby the dosing system and the communicating ducts 21 and 22 are filled with the cleaning agent by causing the piston pump to carry out a few strokes. Filling of the dosing system with cleaning agent can also be made by moving the piston 10 to its bottom position and by opening the suction valve 6 by means of valve spindle 8, so that cleaning agent flows out through the outlet opening 5 of the valve and fills the dosing space of the pump as well as the connecting duct 4 and the dosing tube 3 as far as pressure valve 15. Thereafter piston 10 is caused to move toward the upper open end of cylinder 2 until piston 10 reaches its top position, at which point the pressure exerted by the cleaning agent on valves 6 and 15 causes suction valve 6 to be closed and pressure valve 15 to be opened so that cleaning agent flows in and fills the remainder of dosing tube 3. After one or more strokes of the piston lines 21 and 22 are filled with cleaning agent.

Now the cleaning process itself can commence, as follows: Piston 10 is caused to move to its bottom position, and a vacuum is formed in the dosing space of piston pump 2 and in the connecting duct 4, so that suction valve 6 is opened and pressure valve 15 is closed. Through the discharge opening 5 of the material container 1 flows cleaning agent which, owing to the motion of the piston, fills the dosing space 12 of pump 2 while at the same time the cleaning agent in the space below piston 10 is caused in the main to circulate through the lower portion of pump cylinder 2 and line 21 to the material container 1, as indicated by means of arrows in FIG. 2. When piston 10, during its downward stroke, reaches the flared part 9 of the pump cylinder the cleaning agent also flows along the peripheral surface of the piston. Hence, the material container 1, its discharge opening 5, suction valve 6, pump cylinder 2 and the upper and lower faces and peripheral surface of the piston as well as the piston rod 11 are rinsed and washed during the downward stroke of piston 10, which is shown in the figure.

In FIG. 3 arrows indicate the main flow of the cleaning agent during the upward stroke of piston 10, the piston having passed its normal bottom position. As piston 10 rises, suction valve 6 is closed and pressure valve 15 is opened, owing to the pressure exerted by the cleaning agent on the valves. During this stage the cleaning agent is caused to circulate within the dosing space 12 of the pump, the connecting duct 4 and the dosing tube 3, the space below piston 10 being filled with cleaning agent via line 22 during the upward movement of the piston, this cleaning agent being mainly that which is in the dosing tube. While piston 10 is upward through the flared part 9 of the cylinder cleaning agent also flows around the peripheral surface of piston 10, this flow being in the main, opposite to the flow during the downward stroke of the piston. After the piston, during its upward stroke, has passed the flared part 9 of the cylinder, as shown in FIG. 4, intense turbulence is produced in the cleaning agent below piston 10. This turbulence can be increased by making the inlet opening 20 of line 22 leading to cylinder 2 relatively small by comparison with the volume below the piston. During the upward stroke of piston 10 the cleaning agent is, in the main, caused to circulate, clean and wash cylinder 2, the upper face and peripheral surface of piston 10, connecting duct 4, pressure valve 15 and dosing tube 3, while at the same time thoroughly cleaning and washing the lower face of piston 10 and its piston rod 11.

Now a cycle has been completed and piston 10 moves towards its bottom position, whereby pressure valve 15 closes and suction valve 6 opens and the dosing space 12 of pump 2 is filled with cleaning agent from material container 1. Thus the cycle described above is repeated and cleaning proceeds by means of a homogeneous flow of the cleaning agent as shown and described in connection with the above figures.

When the system may be regarded as properly cleaned by the cleaning agent, which may, for instance, consist of sodium hydroxide (NaOH) e.g. at a concentration of 2 percent, the system may be rinsed with hot water which is allowed to circulate in the system in the same way as has been described above for the circulation of the agent.

Cleaning of this type is always effective during at least prolonged operational stillstands such as at the end of work e.g. during the night. Before the dosing system is again put into operation, e.g. on the morning of the following day, a further additional cleaning procedure may be carried out. However, cleaning at this time is generally effected in a simpler way, since the system has already previously been washed out. Such simpler cleaning generally consists in a steam treatment of the dosing system, and the communicating duct 21 is therefore provided with a three-way valve, so that steam can be supplied simultaneously to material container 1 and pump cylinder 2 through the communicating duct 21 which is shown in FIG. 5. Before the steam enters the system, line 22 is separated from the outlet of dosing tube 3, valves 6 and 15 are pressed open and piston 10 is moved to its bottom position. This enables the steam introduced into the system to pass through the system, and the main flow of the steam is indicated by arrows in FIG. 5.

Before the dosing system is again put into operation, it is therefore only necessary to replace lines 21 and 22 with sockets 17 and 18 and to fit the fine-mesh screen 13 in dosing tube 3, if such a screen is provided.

The cleaning process which has been described should show clearly that absolutely satisfactory cleaning and washing of a dosing system can be effected without any need for removal and dismantling of the system. Besides, effective washing of all parts is achieved, partly because the entire system is completely filled with cleaning agent during the cleaning process and because parts of the system which are difficult to reach such as valves, valve seats and ducts are subjected to effective cleaning. It must also be specially emphasized that the peripheral surface of the piston can be cleaned without any need for dismantling the piston pump.

The embodiment of the invention which has been visualized in this document, is only intended as an example for an arrangement and a method for cleaning dosing systems for liquid material and it should be understood that the arrangement and method in accordance with the invention may be modified in a variety of ways within the framework of the idea underlying the invention and can be used for may different types of dosing systems.

We claim:

1. In a dosing system for dispensing a liquid in doses which comprises a supply container for the liquids, a non-return suction valve at the outlet from said container, a non-return pressure valve at the discharge from the system and a pump-cylinder unit located intermediate said valves for withdrawing the liquid from said container through said suction valve into one end of the cylinder during movement of the piston in one direction and effecting discharge of the drawn off liquid from said cylinder through said pressure valve during movement of the piston in the opposite direction, the improvement whereby to enable said dosing system to be cleaned with a cleaning liquid which is substituted for the liquid normally dispensed comprising an inlet conduit connected between said discharge from the system and the other end of the pump cylinder and an outlet conduit connected between the other end of the pump cylinder and said supply container whereby the cleaning liquid is drawn off from said supply container to said discharge and then returned to said supply container from said discharge through said other end of said pump cylinder as said piston is reciprocated.

2. A dosing system as claimed in claim 1 wherein the end of the cylinder to the rear of the piston is enlarged to have a greater cross-sectional area than the area of the piston, whereby the stroke of the piston during cleaning may be extended to enter the enlarged end of the cylinder whereby cleaning liquid entering the cylinder behind said piston from said inlet conduit may flow around and clean the periphery of the piston when the piston is at the end of the extended stroke for withdrawing liquid from said supply container.

3. A dosing system as claimed in claim 1 wherein the opening in the cylinder behind the piston for admitting cleaning liquid from said inlet conduit is formed as an orifice to create turbulence in the cleaning liquid in the cylinder behind the piston.

* * * * *